United States Patent [19]

Eierle et al.

[11] Patent Number: 5,301,839
[45] Date of Patent: Apr. 12, 1994

[54] SEALANT CARTRIDGE

[75] Inventors: Dieter Eierle; Dieter H. Eierle, both of Hunfelden, Fed. Rep. of Germany

[73] Assignee: Dow Corning GmbH, Fed. Rep. of Germany

[21] Appl. No.: 69,612

[22] Filed: Jun. 1, 1993

[30] Foreign Application Priority Data

Jun. 30, 1992 [GB] United Kingdom ............... 9213852

[51] Int. Cl.⁵ .............................................. B65D 35/14
[52] U.S. Cl. .................................... 222/95; 222/105; 222/327
[58] Field of Search .................. 222/1, 95, 105, 326, 222/327, 386.5, 391

[56] References Cited

U.S. PATENT DOCUMENTS

| | | | |
|---|---|---|---|
| 2,063,410 | 12/1936 | Tear | 222/327 |
| 3,066,836 | 12/1962 | Trumbull | 222/327 |
| 4,854,485 | 8/1989 | Collins | 222/327 X |
| 4,949,875 | 8/1990 | Kuo | 222/327 X |
| 4,986,444 | 1/1991 | Corso | 222/23 |
| 5,161,715 | 11/1992 | Giannuzzi | 222/145 |

FOREIGN PATENT DOCUMENTS

| | | | |
|---|---|---|---|
| 254969 | 2/1988 | European Pat. Off. | |
| 2237468 | 2/1975 | France | 222/326 |
| 0669165 | 2/1989 | Switzerland | 222/95 |
| 472432 | 9/1937 | United Kingdom | |
| 1467637 | 3/1977 | United Kingdom | |
| 2088998 | 6/1982 | United Kingdom | 222/95 |
| 2090336 | 7/1982 | United Kingdom | 222/95 |
| 2090921 | 7/1982 | United Kingdom | |

Primary Examiner—Andres Kashnikow
Assistant Examiner—Kenneth Bomberg
Attorney, Agent, or Firm—Roger H. Borrousch

[57] ABSTRACT

A dispensing cartridge, suitable for sealant sausages in use with mechanical and pneumatic sealant applicator guns, comprises a sleeve, a detachable end cap with releasable nozzle and a plunger. The plunger has offsets on its leading and trailing edges, which are the only portions which form a seal with the interior surface of the sleeve. Preferably the support portion of the plunger is bi-concave and the sleeve adapted to receive the end cap on either end. This renders the cartridge bi-directional, allowing loading of sausages and extrusion at either end.

9 Claims, 3 Drawing Sheets

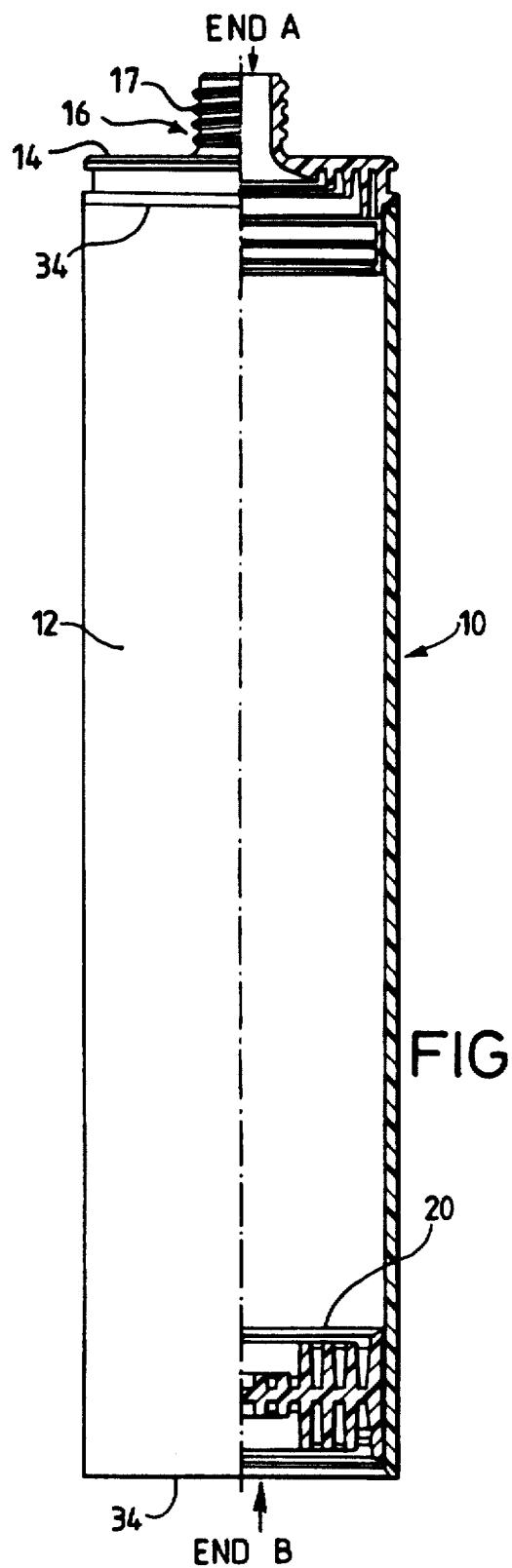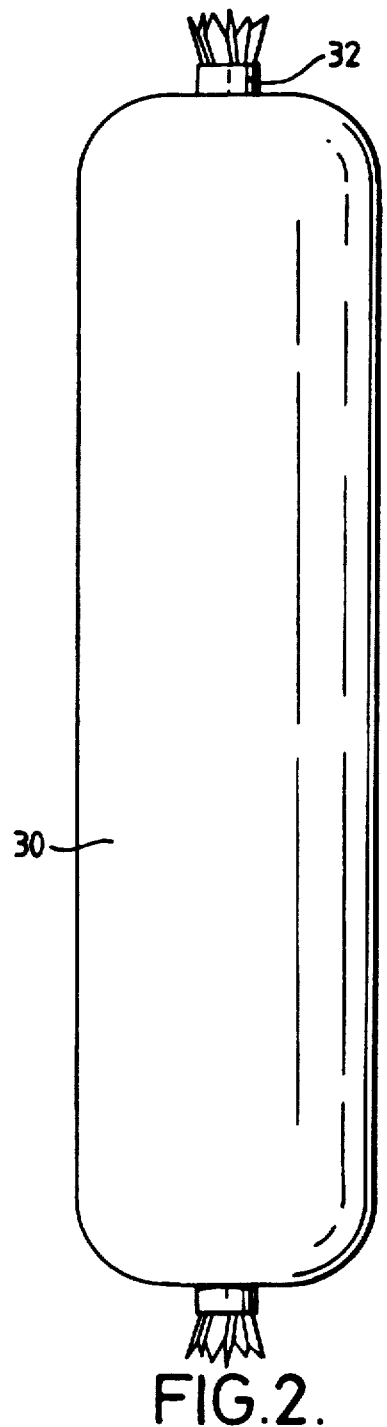

SEALANT CARTRIDGE

This invention is concerned with dispensing cartridges, especially cartridges for extrusion of plastic viscous materials through a nozzle for use in conjunction with an applicator gun. The invention is particularly concerned with cartridges for sealant, putty or mastic materials, e.g. in glazing, caulking, jointing or general sealing.

It is common practice to package sealant compositions in cartridges adapted to be loaded into extrusion devices in order to dispense sealant compositions. For many years conventional sealant cartridges comprised an integrally moulded cylindrical body and nozzle with exit orifice forming a single piece of material and a plunger disposed within the cylindrical body. A cavity defined by the face of the plunger in the discharge direction and the inner wall of the moulded cartridge contained a sealant mass which could be discharged through the exit orifice upon application of a force to the plunger by an extrusion device employing mechanical or pneumatic means. However, after a sealant was extruded the dispensing cartridge would be discarded.

This represents a considerable waste of resources and money and is undesirable for environmental reasons. In order to avoid discarding dispensing cartridges manufacturers started producing sealant compositions in the form of so called "sausages". Sausages consist of a lightweight, flexible, usually air and moisture impermeable casing encapsulating a sealant composition. They may be introduced into dispensing cartridges or sealant gun barrels and the sealant discharged in conventional manner. The only waste associated with the extrusion process as a result of using such sausages is the exhausted sausage casing.

Sealant guns are known which are adapted for use with sealant sausages. Sealant guns of this type generally comprise a fully enclosed gun barrel with a nozzle assembly forming an integral part of the barrel, or releasably attached to the barrel with suitable securing means, a piston disposed within the barrel and pneumatic means for actuating the piston located at the opposite end of the barrel which is operated using a trigger mechanism.

Alternative sealant dispensing systems for use with sealant sausages are adapted to be used with mechanical sealant guns, e.g. skeleton guns. Here the sausages are mounted into cartridges which comprise a cylindrical sleeve, an end cap and a plunger disposed within the sleeve. The plunger, inner wall of the sleeve and the end cap provide a cavity for the sealant sausage. The sleeve is adapted at one end to releasably receive the end cap. The main body of the plunger comprises a cylindrical surface in sliding contact with the inner wall of the sleeve and faces, but does not provide an airtight seal, as such seals tend to be fairly hard to operate smoothly by mechanical pressure due to the increased frictional contact between plunger and sleeve surfaces.

In one commercially available dispensing cartridge for use with manual sealant guns the main body of the plunger comprises a cylindrical surface having one face which is substantially flat, against which force is brought to bear from a gun mechanism, the other face, in the discharge direction provides attachment means for fixing thereto a pressure relief spring which comprises a disc with diametrically opposed tongues, slightly larger in diameter than the main body of the plunger and is in frictional engagement with the inner wall of the sleeve. A plurality of holes run through the main body of plunger and the pressure release disc thus creating a pressure equalising effect as the plunger is driven along the sleeve.

Extrusion devices employing such a cartridge generally comprise a framework in which the cartridge is supported and means for supplying a force to the plunger such as a piston which is actuated by mechanical means using a trigger mechanism, for example a skeleton gun.

In E.P. 254 969 there is provided an appliance for extrusion of sealant material encapsulated in a sausage, comprising a cylinder adapted to receive said sausage and a plunger which is provided with a pressure release spring attached to one face thereof. The specification states that where pneumatic means are provided for moving the plunger, an elastic closure having a diameter slightly larger than the diameter of the main body of the plunger should be provided to seal the plunger against the inner surface of the cylinder. Said elastic closure is attached to a face of the plunger opposing the face connecting the pressure release spring.

Whilst the appliance described above is satisfactory in many respects, the appliance is unsuitable for use in both mechanically operated and pneumatic extrusion devices without necessary replacement of the plunger. Such replacement requires the dismantling and reassembly of the appliance, a time consuming process which is an inconvenience to an operator. Also the use of plungers which are suitable for pneumatically operated applicator guns tend to be too difficult to move smoothly in manually or mechanically operated guns.

It is desirable to provide a cartridge which is suitable for use in mechanical and pneumatic extrusion devices and which requires no adaptation when changing from a mechanical to a pneumatic device.

Extruding apparatus with plungers which are fluid-tight or air-tight have been disclosed in G.B. specification 1 467 637. The plunger in said apparatus is described as a piston which may take the form of two cup washers of neoprene or other suitable material, these washers being secured back-to-back with an intervening metal disc or other stiffening member so as to operate in fluid-tight or airtight fashion in a gun barrel. Such plungers are multi-component, and hence relatively labour-intensive, to make and are not very efficient or wear-resistant, especially when used in conjunction with a mechanical device to push the plunger along.

We have now found that if the plunger is made from a substantially rigid, i.e. not easily deformable in normal use, one part plastic material with leading and trailing edges which provide an airtight seal against the inner surface of the sleeve, while the rest of the plunger which is in contact with the inner surface of the sleeve is at most in slidable contact with said surface, i.e. not in sealing contact, then the plunger gives sufficient airtightness to be useful with pneumatically operated applicator guns, whilst at the same time not requiring excessive force to slide along the length of the sleeve, so as to be useful in mechanically and manually operated applicator guns.

According to the present invention there is provided a dispensing cartridge which is capable of being used in conventional mechanically and pneumatically operated applicator guns which comprises a self-supporting sleeve having an interior surface, a detachable end cap including an exit port through which a composition may be urged from the cartridge and a plunger positioned within the sleeve in slidable relationship therewith, the sleeve, end cap and plunger defining a cavity for a mass of sealant composition characterised in that the plunger seals one end of said cavity, is made from one part of plastic material and comprises an outer wall having offsets on leading and trailing edge portions adapted to be in frictional engagement with the interior surface of the sleeve, said offsets on leading and trailing edges being the only portions of the plunger which form a seal with the interior surface of the sleeve and a support portion constructed in such a way that the plunger may be moved in either direction axially within the sleeve and in such a way that when pressure is applied to the support portion, the plunger is urged from one end of the sleeve to the other whilst the offsets on the leading and trailing edge portion maintain sealing contact with the interior surface of the sleeve.

In a dispensing cartridge according to the invention the sleeve may be made of any suitably durable self-supporting material capable of withstanding pressures associated with the extrusion process for example metals such as stainless steel and aluminium or plastics such as pvc and polyethylene. It is preferred that the sleeve is made of plastics material. The sleeve may be machined, moulded, blown or extruded into the correct shape and dimensions to be fitted into conventional extrusion devices. It is preferred that the sleeve is cylindrical in shape. The inner or interior and outer or external surfaces of the sleeve may be uniformly smooth or alternatively the inner or outer surface at either or both ends of the sleeve may incorporate a portion of suitable releasable securing means such as a screw thread attachment. It is preferred that the sleeve is adapted to receive an end cap on either extremity.

In a dispensing cartridge according to the invention the end cap may be formed of the same as, or different, material from the sleeve and is preferably made of plastics material. The end cap provides an exit orifice through which sealant composition may be extruded via a nozzle. The end cap and nozzle assembly may be integrally formed, although preferably the end cap and nozzle are formed separately. In a preferred sealant cartridge the nozzle is adapted to be secured to the end cap with releasable securing means for example bayonet or screw thread means. It is an advantage if the nozzle can be removed to be washed or discarded rather than having to wash or discard the entire end cap. In addition, if the application requires a different size nozzle for example, the nozzle needs to be removed and replaced readily.

A portion of the outer surface of the end cap is shaped to be adapted to engage the inner wall of the sleeve thus fitting the end cap to the sleeve. It is preferred that the portion of the outer surface of the end cap in intimate contact with the sleeve has exhaust means for allowing egress of air from the cavity as the plunger is advanced along the sleeve in the direction of the exit nozzle. The exhaust means may comprise one or more of grooves, ridges, other types of elevations, e.g. small round projections, placed on or running across the surface of the end cap which is in intimate contact with inner surface of the sleeve to create a little channel between the inner wall of the sleeve and the end cap or holes drilled in the sleeve towards each extremity of the sleeve.

The inner face of the end cap may be substantially flat or concave. Although a smooth inner face may provide more complete exhaustion of the sealant composition from the sausage it is preferred that the inner face is formed with a series of cylindrical ribs which extend axially to provide abutment surfaces and act to increase rigidity. In a particularly preferred embodiment the inner surface comprises a substantially concave face with a plurality of abutment surfaces. This embodiment is found to be particularly effective at preventing undesirable lateral movement or sliding of a sausage placed in the cavity during the extrusion process and ensures that the composition is correctly expressed through the exit orifice.

In skeleton guns the end cap would be used at all times. However, some pneumatic applicator guns allow for insertion of cartridges with an end cap, whereas others would only allow for the use of a cartridge sleeve with plunger, using the nozzle assembly of the gun itself. This latter type is exemplified in G.B. 2 090 921. In such applicator guns the cartridge of the present invention could be used without the end cap.

In a sealant cartridge according to the invention the plunger comprises an outer wall and a support portion. The plunger must be substantially rigid and consists of one component only. It is made from a substantially rigid material, i.e. a material which will not deform under normal conditions of use. This is important in view of the need to push the viscous sealant material towards and through the extrusion nozzle.

The outer wall of the plunger is preferably a cylindrical or substantially cylindrical surface. Whilst all of the outer wall may be in slidable engagement with the inner wall of the sleeve it should not be in frictional engagement therewith. The frictional sleeve engaging surface of the outer wall must be provided by sealing arrangements in the form of offsets on the leading and trailing edges of said outer wall to provide a seal between the outer wall of the plunger and the inner wall of the sleeve whilst keeping the area of outer wall of the plunger in frictional contact with the sleeve to a minimum and retaining a good seal.

It is important that the sealing must be performed by the offsets on the leading and trailing edges of the outer wall, as this will at the same time ensure sufficient airtightness and sufficiently low friction to allow smooth use with mechanical applicator guns. The offsets take the form of slight outward extensions of the leading and trailing edges and are slightly more flexible than the rest of the plunger, generally due to the fact that the offsets are made from a thinner section of plastic. This allows them to adapt to the shape of the inner sleeve and maintain a good seal. A good seal is one which is firstly sealant-tight, and secondly sufficiently air-tight to enable the plunger to be moved by a pneumatic applicator gun. Preferably the airtightness is such that a hermetic seal is formed. The offsets usually are such that they have a slightly larger outside diameter than the rest of the plunger, and preferably slightly larger than the inner diameter of the sleeve, where this is in its preferred cylindrical shape. This ensures sealing contact between the offsets and the inner wall of the sleeve. The relative flexibility of the offsets allows the plunger to be fitted inside the sleeve without damaging the offsets. Another advantage of the use of these offsets is that the risk of trapping any part of the sausage, e.g. the casing where the sausage is partially exhausted, between the plunger and the inner surface of the sleeve. This could happen where cup washers or O-ring seals are used and would result in breaking the seal or damaging the sausage casing. Where a damaged casing is entered into the sleeve the offsets would also act as a scraper, avoiding the loss of any sealant material which would be deposited on the sleeve.

The support portion of the plunger comprises two opposing faces. One of the faces provides a surface upon which a force may be brought to bear from mechanical or pneumatic means of an extrusion device in the direction of the nozzle. The opposite face of the support portion is adapted to abut a sealant sausage which may be placed in the cartridge enabling the sealant to be urged in the direction of the nozzle assembly. Either or both faces of the support portion may be substantially flat, concave or with a central depression. In a preferred embodiment both faces are identical and preferably provide a substantially concave support portion or substantially flat with a central depression. The central depression would preferably be adapted to receive the sealed end of a sausage. Both faces can therefore equally be used as the abutment surface for a sealant sausage or as the surface upon which a force may be brought to bear in the direction of the exit nozzle. In a preferred embodiment the faces of the support portion are provided with supporting ribs extending diametrically and concentric cylindrical ribs. Both types of ribs do not have to have the same depth. It is preferred that at least the concentric cylindrical ribs provide abutment surfaces for a sealant sausage. Both types of ribs will add strength to the support portion.

It is preferred to reduce the amount of space between the end cap and the plunger when abutting against the end cap, to a minimum, i.e. the space taken up by an exhausted sausage casing, to ensure that the sausage can be fully exhausted prior to removal from the cartridge. This may be done by limiting the length of the part of the end cap which is in intimate contact with the inner surface of the sleeve without affecting its security when fitted on the end of the cartridge or by adjusting the shape of the inner surface of the end cap and/or of the support portion of the plunger, e.g. by making it less concave or even substantially flat.

In its preferred embodiment the sleeve is adapted to receive an end cap on either end and both ends of the support part of the plunger are concave or substantially flat with a central depression, allowing the cartridge to be used in either direction for extrusion. Such bi-directional use has been described in G.B. patent specification 2 090 921 for cartridges intended for use with pneumatic applicator guns for dispensing of e.g. hot melt adhesives. These cartridges, however, have no end cap provision and are not usable in mechanical (manual) applicator guns such as skeleton guns.

In use the end portion of a sealant sausage is severed from the sausage casing. The end cap is removed from the cartridge and the sausage loaded into the cavity in the sleeve with its sealed end in contact with the plunger. When the sausage is loaded the end cap is replaced, a nozzle is attached to the end cap, the cartridge is inserted into an extrusion device and the pressure means disposed against the plunger. The plunger is thus driven along the sleeve in the direction of the exit nozzle. When the plunger is displaced to its maximum extent and abuts the end cap, the end cap is removed and the exhausted sausage is discarded. Another sausage may then be inserted in the other end of the sleeve and the end cap fitted to that end. The cartridge may then be inserted into the extrusion device and process repeated. An advantage of this process is that it is not necessary for the operator to force the plunger down the sleeve to its initial position before a new sausage is loaded into the cartridge.

There now follows a description to be read with the accompanying drawings of one example cartridge selected to illustrate the present invention. In the drawings:

FIG. 1 is a longitudinal view, partly in section, of the illustrative cartridge;

FIG. 2 is an elevation of a sausage comprising a casing encapsulating a sealant composition and suitable for use in the illustrative cartridge;

Figure 3:
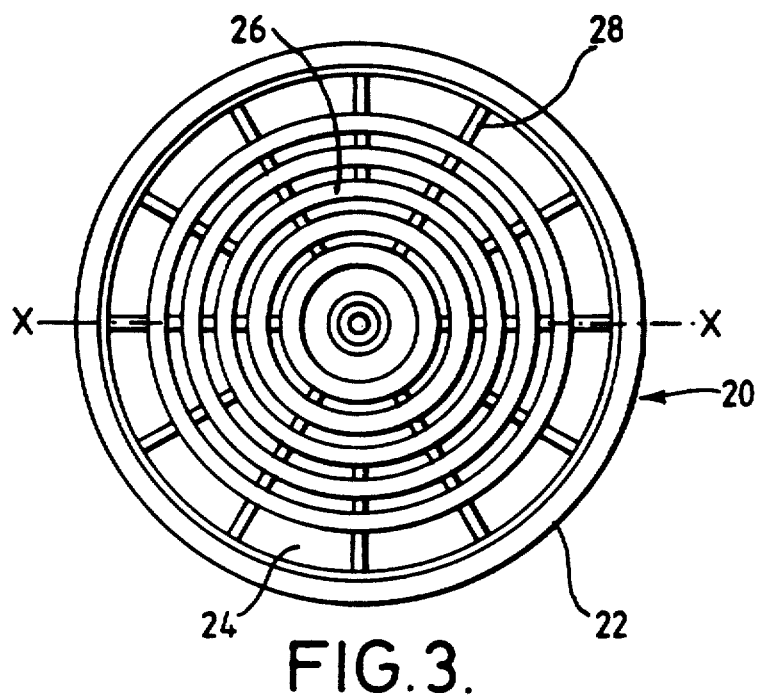
FIG. 3 is a plan view of a plunger of the illustrative cartridge.

The illustrative cartridge is a sealant cartridge (10) and comprises a cylindrical plastic sleeve (12), a removable end cap (14) and a plunger (20) in frictional engagement with an interior surface of the sleeve and capable of being urged from one end of the sleeve to the other. The cylindrical sleeve is of a size and shape to receive a sausage (30) (FIG. 2).

Figure 5:
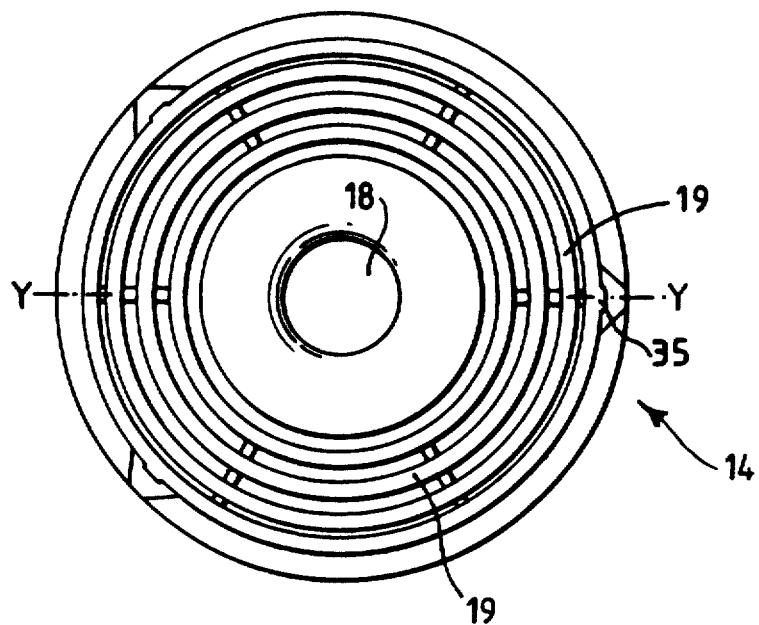
FIG. 5 is a plan view of an end cap of the illustrative cartridge.
Figure 6:
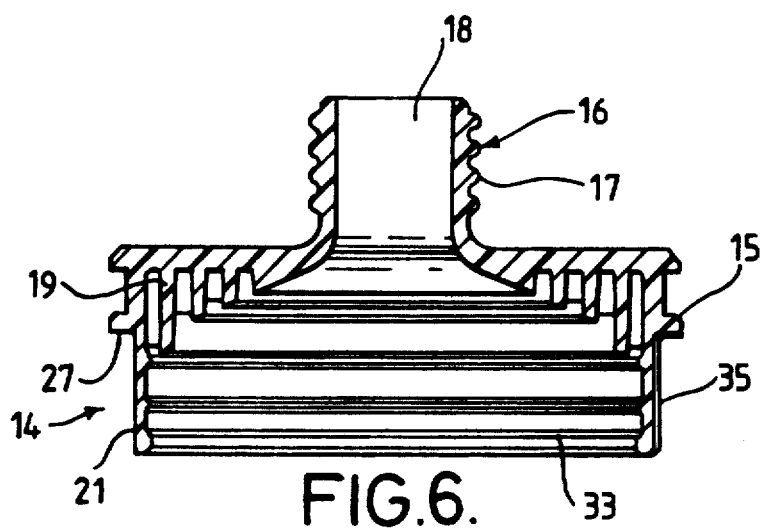
FIG. 6 is a sectional view taken substantially on the line Y—Y of FIG. 5.

The end cap (14) (FIGS. 1, 5 and 6) has an integrally formed projection (16) which provides an exit orifice (18) which has an external screw thread (17) adapted to receive a nozzle (not shown) through which sealant composition may be extruded. The end cap is circular in cross section and is formed with a series of concentric cylindrical ribs (19) providing abutment surfaces for the casing (30) and contributing to rigidity of the end cap. An outer surface of the end cap comprises a cylindrical surface (21) which fits snugly into either end portion of the sleeve and a portion (15) which is adapted to extend beyond the sleeve and has an abutment flange (27) adapted to engage a circumferential surface (34) of the sleeve. Cylindrical reinforcing ribs (33) are provided at the inner side of the cylindrical surface (21). A plurality of ridges run across the surface (21) providing exhaust means (35).

Figure 4:
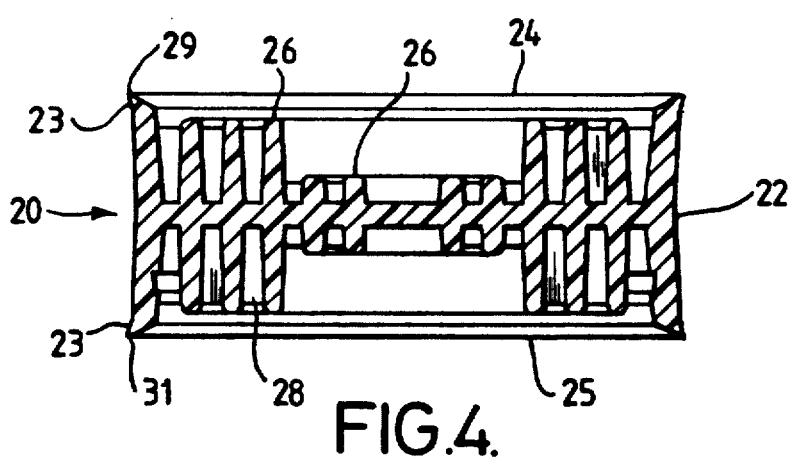
FIG. 4 is a sectional view taken substantially on the line X—X of FIG. 3.

The plunger (20) (FIGS. 1, 3 and 4) comprises a one piece moulding of plastics material having an outer wall (22) and a support portion providing opposing faces (24, 25). The outer wall (22) is substantially cylindrical but has a somewhat concave outer surface (23) as viewed in FIG. 4 which terminates in leading (29) and trailing (31) edge portions adapted to be in frictional engagement with the interior surface of the sleeve. The concavity of the surface (23) enables the wall to flex sufficiently to obtain a suitable sealing between the plunger and the sleeve during use. Inner surfaces of the edge portions (29,31) are inclined towards the centre of the support portion. The support portion provides faces (24,25) comprising supporting ribs (28) extending diametrically and concentric cylindrical stiffener ribs (26). The support portion is constructed in such a way that when pressure is applied to one side thereof, the plunger can be urged from one end of the sleeve to the other, whilst the leading edge and trailing edge portions (29,31) maintain sealing contact with the inner surface of the sleeve.

In use of the illustrative cartridge, an end portion (32) of a sausage (30) as shown in FIG. 2 may be severed from the sausage casing. The end cap (14) is removed from the illustrative cartridge and the sausage casing loaded into the sleeve at end A with its sealed end portion directed towards the plunger (20). When the sausage (30) has been loaded into the sleeve (12), the end cap (14) may be replaced on the sleeve (12) at end A. The loaded cartridge may then be inserted in a sealant extrusion gun in which the end cap (14) is held by the gun and a force from the extrusion gun is disposed against the support portion of the plunger (20), urging the plunger (20) along the sleeve (12) in the direction of the exit port (18) (end A). Movement of the plunger (20) urges sealant composition from the sausage casing out of the cartridge through the exit port (18) and the nozzle (16). Movement of the leading edge (29) urges the sausage casing along the sleeve. When the sealant composition has been exhausted from the cartridge, the cartridge may be removed from the sealant extrusion gun, the end cap removed from end A and the sausage casing removed. Another sausage casing may then be inserted into the opposite end of the sleeve at end B with the sealed end facing the plunger and the end cap placed over that end (end B), there being no need to return the plunger to its initial position. The reloaded cartridge may then be inserted in the sealant extrusion gun and operation continued as before.

That which is claimed is:

1. A dispensing cartridge (10), suitable for use with sealant applicator guns, comprising a self-supporting sleeve (12) having an interior surface, a detachable end cap (14) including an exit port (18) through which a composition may be urged from the cartridge and a plunger (20) positioned within the sleeve (12) in slidable relationship therewith, the sleeve (12), end cap (14) and plunger (20) defining a cavity for a mass of sealant composition, wherein the plunger (20) is made from one part of plastic material and comprises an outer wall (22) having offsets on leading and trailing edge portions (29,31) adapted to be in frictional engagement with the interior surface of the sleeve (12), said offsets being the only portions of the plunger (20) which form a seal with the interior surface of the sleeve (12) and a support portion constructed in such a way that the plunger (20) may be moved in either direction axially within the sleeve (12) and in such a way that when pressure is applied to the support portion (24,25), the plunger (20) is urged from one end of the sleeve (12) to the other whilst the offsets on the leading and trailing edge portion (29,31) maintain sealing contact with the interior surface of the sleeve (12), wherein the support portion of the plunger (20) is provided with supporting ribs (28) extending diametrically and concentric cylindrical ribs (26).

2. A dispensing cartridge (10) according to claim 1 which is made of plastics material.

3. A dispensing cartridge (10) adapted for use in conjunction with a sausage (30) having a casing according to claim 1 wherein the amount of space between the end cap (14) and the plunger (20) when abutting against the end cap (14), is reduced to the space taken up by the exhausted casing of the sausage to ensure that the sausage (30) can be fully exhausted prior to removal from the cartridge.

4. A dispensing cartridge (10) according to claim 1 wherein the end cap (14) has exhaust means (35) for allowing egress of air from the cavity.

5. A dispensing cartridge (10) according to claim 1 wherein an inner face of the end cap (14) is formed with a series of cylindrical ribs (19) which extend axially to provide a plurality of abutment surfaces.

6. A dispensing cartridge (10) according to claim 1 wherein the offsets of the plunger (20) take the form of slight outward extensions of the leading and trailing edges (29,31), have a slightly larger outside diameter and are more flexible than the rest of the plunger.

7. A dispensing cartridge (10) according to claim 1 wherein the support portion of the plunger (20) provides a substantially concave support portion.

8. A dispensing cartridge (10) according to claim 1 wherein each face (24,25) of the support portion of the plunger (20) is substantially flat with a cental depression.

9. A dispensing cartridge (10) according to claim 1 wherein the sleeve (12) is adapted to receive an end cap (14) on either extremity, both sides (24,25) of the support portion of the plunger (20) are adapted to serve both as abutment surface for a sealant sausage (30) and as the surface upon which a force may be brought to bear to cause the plunger (20) to move in the direction of the exit nozzle.

* * * * *